US010829205B2

(12) United States Patent
Reckzeh et al.

(10) Patent No.: US 10,829,205 B2
(45) Date of Patent: Nov. 10, 2020

(54) INTEGRAL COMPONENT WITH AN ACTIVE FLOW CONTROL DEVICE

(71) Applicant: AIRBUS OPERATIONS GMBH, Hamburg (DE)

(72) Inventors: Daniel Reckzeh, Hamburg (DE); Bruno Stefes, Hamburg (DE); Matthias Lengers, Hamburg (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 392 days.

(21) Appl. No.: 15/854,307

(22) Filed: Dec. 26, 2017

(65) Prior Publication Data

US 2018/0134373 A1 May 17, 2018

Related U.S. Application Data

(63) Continuation of application No. PCT/EP2016/065360, filed on Jun. 30, 2016.

(30) Foreign Application Priority Data

Jul. 3, 2015 (DE) .......................... 10 2015 110 782

(51) Int. Cl.
*B64C 21/08* (2006.01)
*F15D 1/00* (2006.01)
*B33Y 80/00* (2015.01)
*B64C 3/20* (2006.01)
*B64C 21/04* (2006.01)
*B64C 21/06* (2006.01)
(Continued)

(52) U.S. Cl.
CPC .............. *B64C 21/08* (2013.01); *B33Y 80/00* (2014.12); *B64C 3/20* (2013.01); *B64C 21/04* (2013.01);
(Continued)

(58) Field of Classification Search
CPC ........... B64C 3/20; B64C 21/08; B64C 21/04; B64C 21/06; B64C 2230/04;
(Continued)

(56) References Cited

U.S. PATENT DOCUMENTS

| 1,979,298 | A |   | 11/1934 | Trey et al. |
| 3,889,903 | A | * | 6/1975  | Hilby ...................... B64C 21/04 |
|           |   |   |         | 244/207 |

(Continued)

FOREIGN PATENT DOCUMENTS

GB          1399606 A        7/1975

OTHER PUBLICATIONS

International Searching Authority, International Search Report for International Application PCT/EP2016/065360, dated Oct. 14, 2016.

*Primary Examiner* — Rodney A Bonnette
(74) *Attorney, Agent, or Firm* — Nixon & Vanderhye P.C.

(57) ABSTRACT

A flow body for a vehicle includes at least one planar skin section with an outer side, an inner side and at least one opening that penetrates the skin section, as well as at least one active flow control device that is designed for moving an air volume. The at least one active flow control device includes an air discharge section that is fluidically connected to the at least one opening, wherein the air discharge section and the at least one planar skin section are manufactured by a layer manufacturing process in the form an integral component that is free of joints, and wherein the air discharge section at least partially supports the skin section in a load-bearing fashion.

9 Claims, 2 Drawing Sheets

(51) Int. Cl.
 *B33Y 10/00* (2015.01)
 *B22F 3/105* (2006.01)

(52) U.S. Cl.
 CPC ............. *B64C 21/06* (2013.01); *F15D 1/008* (2013.01); *F15D 1/0055* (2013.01); *F15D 1/0085* (2013.01); *B22F 3/1055* (2013.01); *B33Y 10/00* (2014.12); *B64C 2230/04* (2013.01)

(58) Field of Classification Search
 CPC ...... F15D 1/0055; F15D 1/008; F15D 1/0085; B33Y 80/00; B33Y 10/00; B22F 3/1055
 See application file for complete search history.

(56) References Cited

U.S. PATENT DOCUMENTS

| | | | | |
|---|---|---|---|---|
| 3,917,193 | A * | 11/1975 | Runnels, Jr. | B64C 9/24 244/207 |
| 4,099,691 | A * | 7/1978 | Swanson | B64C 21/04 244/134 B |
| 4,285,482 | A * | 8/1981 | Lewis | B64C 9/22 244/207 |
| 5,934,611 | A * | 8/1999 | Tindell | B64C 21/025 181/214 |
| 5,951,254 | A | 9/1999 | Sikorski et al. | |
| 7,757,994 | B2 | 7/2010 | Schrauf | |
| 8,091,837 | B2 | 1/2012 | Frankenberger et al. | |
| 8,844,571 | B2 | 9/2014 | Golling et al. | |
| 9,371,131 | B2 | 6/2016 | Bauer et al. | |
| 2007/0221788 | A1* | 9/2007 | Meister | B64C 21/025 244/208 |
| 2013/0240676 | A1* | 9/2013 | Golling | B64C 21/06 244/208 |
| 2013/0277502 | A1* | 10/2013 | Bauer | B64C 21/08 244/208 |
| 2015/0158577 | A1 | 6/2015 | Guillemaut et al. | |

* cited by examiner

INTEGRAL COMPONENT WITH AN ACTIVE FLOW CONTROL DEVICE

CROSS-REFERENCE TO PRIORITY APPLICATIONS

This application is a continuation of international patent application number PCT/EP2016/065360, having an international filing date of Jun. 30, 2016, which claims priority to German patent application number DE 102015110782.1, having a filing date of Jul. 3, 2015. The content of the referenced applications is incorporated by reference herein.

TECHNICAL FIELD

Embodiments of the invention relate to a flow body with an active flow control device, a vehicle equipped therewith, as well as a method for manufacturing such a flow body in the form of an integral component.

BACKGROUND

Various active flow control devices known from the prior art are coupled to a component that is exposed to a flow and comprises a perforation, slots or other openings, through which air may be blown into or extracted from a flow boundary layer forming on the component. In this way, the flow around the component may be actively influenced such that, for example, a stall may be delayed and/or the flow around the component may be largely made laminar.

Devices for conveying air are typically arranged on an inner side of the component and fluidically connected to one or more openings. Corresponding structural space is required on the inner side of the component depending on the respective design.

In addition to motor-driven diaphragm pumps for conveying air, it is also known to use fluidic actuators for generating flow pulses for this purpose. It is furthermore known to continuously extract air with the aid of a suction line or to eject air from a compressed air line in a valve-controlled fashion.

German patent document DE 10361390 A1 discloses a method and a device for extracting the boundary layer of an aerodynamic body.

International patent document WO 2011009633 A1 describes a fluid actuator for producing a pulsed outlet flow in the flow around an aerodynamic body.

BRIEF SUMMARY

A weight reduction and a reduction of the structural space required for systems and devices are always desirable with respect to improving the performance of a vehicle, particularly an aircraft. The objective of this disclosure therefore may be seen in proposing an improved active flow control device that requires minimal structural space and has a minimal weight.

This objective is attained by means of a flow body with an active flow control device according to the characteristics of independent claim 1. Advantageous embodiments and enhancements are disclosed in the dependent claims and in the following description.

This disclosure proposes a flow body for a vehicle that comprises at least one planar skin section with an outer side, an inner side and at least one opening that penetrates the skin section, as well as at least one active flow control device that is designed for moving an air volume. The at least one active flow control device comprises an air discharge section that is fluidically connected to the at least one opening. The air discharge section and the at least one planar skin section are manufactured by means of a layer manufacturing process and form an integral component that is free of joints, wherein the air discharge section at least partially supports the skin section in a load-bearing fashion.

The planar skin section decisively defines the external shape of the surface that is exposed to a flow and therefore the aerodynamic properties of the flow body. The integration of an active flow control is particularly sensible on flow bodies with a leading edge that is directed into the flow and from which the flow body widens downstream. In this case, the at least one opening penetrating the skin section particularly is arranged in a region located quite close to the leading edge, wherein it would also be conceivable to provide several openings downstream in succession. It may be particularly sensible to arrange the at least one opening in a front third of the flow body. The at least one opening makes it possible to move air, which is fluidically connected to a flow boundary layer, between the inner side and the outer side of the skin section such that the flow surrounding the flow body may be purposefully and actively influenced.

The design of a conveying device for moving air decisively depends on the active flow control device to be used. It may comprise a continuous conveyance, a continuous conveyance over a certain period of time and a conveyance that is interruptible on demand, as well as an alternating or pulsating conveyance of air. The devices used for this purpose may be designed very differently and in addition to a simple air duct also comprise valves, air chambers, fluidic actuators or the like.

The flow body according to the disclosure is characterized in that the active flow control device comprises an air discharge section, which is manufactured in one piece with the planar skin section and free of joints by means of a layer manufacturing process (layerwise buildup process), wherein the air discharge section is designed for supporting the skin section in a load-bearing fashion. This means no additional reinforcing components, which in the prior art typically extend on the inner side of aircraft components exposed to a flow and, in particular, parallel to a corresponding leading edge, are required for the skin section at least in the region, in which the air discharge section of the active flow control device is arranged. In this case, the air discharge section should merely be considered as a segment of the active flow control device that is in contact with the skin section and through which air is moved. In other words, the air discharge section is a section of the active flow control device that is arranged downstream of an active, air-conveying element and serves for conducting air from the active element to the at least one opening.

The integral one-piece design of the flow body with integrated air discharge section has a particularly small space requirement, a particularly low weight in comparison with conventionally manufactured components and furthermore is practically maintenance-free because no seals are required between the active flow control device and the inner side of the skin section. The integral construction eliminates the need for such additional seals because no joints to be sealed exist.

In this context, it should be mentioned that, depending on the chosen active flow control device, the air discharge section could also have a completely different design without having to forgo the advantages according to the disclosure. Since the number, design and arrangement of the openings in the skin section depend on the aerodynamic properties of the flow body and the desired flow control and the openings frequently extend over a certain distance or a strip-shaped section, it is preferred to realize a connection between an active flow control device and an elongate or strip-shaped region on the inner side of the skin section. Consequently, the air discharge section may fulfill a reinforcing function regardless of the active flow control device used because loads acting upon the skin section via the elongate or strip-shaped region may be absorbed by the air discharge section.

The shape of the flow body is chosen depending on the type of vehicle and the intended use. If the flow body is used on an aircraft, in particular, the flow body may form at least a portion of a main wing or slat or of a tail unit such as an elevator unit or rudder unit, particularly a portion that protrudes into the flow. To this end, the flow body does not have to form the entire component of the vehicle, but may also be restricted to an aerodynamically interesting portion, particularly on larger components. In the realization of a section of a component of a vehicle, it may be sensible to design the skin section in such a way that boundary edges comprise fastening elements such as connecting straps, flanges or receptacle devices for fastening means, by means of which the flow body may be connected to a remaining portion of the respective component.

It may likewise be advantageous to manufacture particularly large flow bodies in the form of several partial bodies that are connected to one another after the manufacture in order to form the flow body. In the context of the disclosure, the partial bodies themselves naturally are realized free of a joint. However, this does not include the completely separate parts manufacture of an air discharge section and a skin section.

In an advantageous embodiment, the air discharge section comprises an elongate plenum chamber that encloses a space between the inner side of the skin section and a plenum chamber surface. The plenum chamber serves for generating compressed air that leads to the conveyance of air through the at least one opening. The plenum chamber may therefore also be referred to as pressure chamber. The plenum chamber may be connectable to an air duct such that an air source or air sink, which is fluidically connected to the air duct, may be connected to the flow body in order to achieve the active flow control. The flange may be directly connected to the air source or air sink or alternatively via a valve arranged upstream of such an air source or air sink. The utilization of such a plenum chamber, which is integrated into the flow body, eliminates the need for a separate manufacture of such a plenum chamber, as well as its elaborate attachment and sealing arrangement with consideration of the motions and deformations that occur during the operation of the vehicle and always affect a sealed connecting region. The structural space occupied by the plenum chamber may thereby also be chosen as small as possible as long as the desired flow characteristics into the plenum chamber and out of the plenum chamber are not affected. The elimination of a connecting region and the elimination of connecting means also results in an additionally reduced weight. Furthermore, a comparatively large amount of sealing material used in the prior art is eliminated.

In an advantageous embodiment, the plenum chamber is connected to an air duct that at least sectionally extends into the plenum chamber and comprises a perforation. The perforation makes it possible to convey air from the air duct into the plenum chamber or from the plenum chamber into the air duct. Due to the utilization of the plenum chamber, a certain pressure level, which causes the flow of air through the openings of the flow body, may be built up in the plenum chamber by conveying air through the air duct. In addition to forming an outer shell that defines the plenum chamber in the interior of the flow body, the air duct may also fulfill a load-bearing function.

To this end, webs are arranged between the air duct and the inner side of the skin section or the plenum chamber in an advantageous embodiment, wherein said webs make it possible to achieve a particularly uniform load transmission between the air duct, the plenum chamber and/or the skin section. The webs may also be used for producing a seal between the air duct and the plenum chamber if they are continuously arranged between the plenum chamber and the air duct.

In an additionally enhanced embodiment, the air duct may be realized in the form of a material section that extends along the inner surface of the plenum chamber, namely between an inner side of the skin section and a spaced-apart wall of the plenum chamber. The integrative design of the plenum chamber and an air duct fluidically connected thereto provides additional advantages with respect to the attainable component weight, as well as the structural space requirement, without having to forgo the advantageous load-bearing function. It is practically impossible to realize such an integrative design with a plenum chamber, which is penetrated by an air duct, by means of any other manufacturing method without risking deformations of the skin section during an elaborate joining process, without having to use an excessive number of connecting elements and without requiring a sufficient seal with the aid of a curable sealing material introduced between connecting regions.

It is particularly advantageous if the skin section comprises at least one slot that extends along an extending direction and is fluidically connected to the plenum chamber. Although the integration of a slot locally weakens the mechanical strength of the skin section, this is completely compensated by the integrally manufactured plenum chamber.

In another advantageous embodiment, the air discharge section comprises several fluidic actuators that are designed for generating a pulsating air flow. For example, a fluidic actuator comprises two outlet lines that are connected to a supply line via a deflection chamber. The outlet line, into which the fluid flows, may be defined by deflecting the flowing fluid in this deflection chamber. An inverse deflection of the fluid flow takes place due to a feedback of the outlet line, through which the fluid flows, to the deflection chamber and in turn causes a change of the outlet line, through which the fluid flows. Consequently, a periodically pulsing flow from two outlet lines is generated due to a double-sided feedback of the outlet lines. An arrangement of this type is known, e.g., from aforementioned WO 2011009633 A1.

The disclosure furthermore pertains to a vehicle with at least one above-described flow body with active flow control. The vehicle may be realized as any type of vehicle, but the advantages of an active flow control particularly manifest themselves on vehicles that may reach high cruising speeds. The vehicle particularly is realized in the form of an aircraft. In this case, the flow body may form a portion of a wing, a rudder unit or in elevator unit, wherein it is particularly sensible that the flow body forms at least a portion of the leading edge.

If a continuous air output is desired, it would be conceivable to use bleed air, particularly in a vehicle in the form of a commercial aircraft, wherein this bleed air would have to be connected to the flow body via an air duct. Due to the relatively high temperature level of bleed air, which may exceed 200° C., it is sensible to manufacture the flow body of titanium. An alternative air source is exhaust air from the passenger cabin, which has a significantly lower temperature and makes it possible to manufacture the flow body of aluminum.

If the flow body is used for an aircraft, it generally has to be observed that particularly flow bodies with a leading edge are dimensioned such that the mechanical loads due to a potential bird strike may be absorbed without damaging a structural element that is crucial for the function of the respective component.

The disclosure furthermore pertains to a method for manufacturing such a flow body, in which processing steps for the layer manufacturing of the flow body are carried out once or multiple times, wherein said processing steps comprise the application of at least one layer section with predefined dimensions, which includes a particulate, highly viscous or liquid material, onto a base layer within a predefined region and the curing of the layer section such that the material forms a solid layer within predefined dimensions, wherein at least one planar skin section with an outer side, an inner side, at least one opening that penetrates the skin section and an air discharge section of an active flow control device designed for moving an air volume, which is fluidically connected to the at least one opening, is manufactured by carrying out said processing steps. The air discharge section and the at least one planar skin section form an integral component that is free of joints, wherein the air discharge section at least partially supports the skin section in a load-bearing fashion.

The curing requires a suitable process depending on the type of material. In the manufacture of ceramic components, for example, by means of laser sintering, a powdery material is locally heated by means of a laser such that the particles in the respective region connect to one another. The manufacture of a metallic component takes place in a very similar fashion. A person skilled in the art is familiar with the respective manufacturing processes.

Due to the frequently elongate design of at least a portion of the flow body, it may be particularly sensible to choose the direction, in which the layers are built up, parallel to a principal extending direction of the respective portion during the manufacture. During the integration of the plenum chamber and/or an air duct, for example, the direction, in which the layers are built up, may in other words be chosen parallel to the axis of the plenum chamber and/or the air duct such that this axis correlates with the direction of the gravitational force while the layer structure is built up. Particularly manufacturing-related steps in the air duct and/or the plenum chamber may thereby be prevented or reduced.

The above-described method may be followed by conventional measures for processing a flow body, by means of which smooth structures may be produced. An additional reduction of potential steps may be achieved, in particular, by treating inner flow surfaces with a pickling solution and optionally acting upon these inner flow surfaces with ultrasound. Depending on the chosen diameters, it would alternatively or additionally by all means be possible to achieve corresponding smoothing with purely mechanical processing using suitable tools.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications of the present disclosure result from the following description of exemplary embodiments and the figures. In this respect, all described and/or graphically illustrated characteristics form the object of the disclosure individually and in arbitrary combination, namely regardless of their composition in the individual claims or their references to other claims. In the figures, identical or similar objects are furthermore identified by the same reference symbols.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
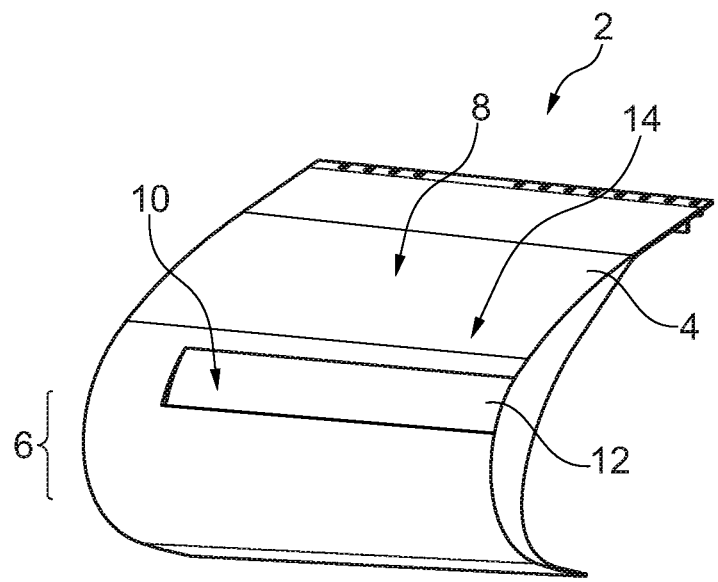
FIG. 1 shows a three-dimensional representation of an outer side of a flow body.

FIG. 1 shows a portion of a flow body 2 with a planar skin section 4 that is curved in order to form a rounded leading edge region 6 designed for protruding into a flow. An outer side 8 of the skin section 4 comprises a depression 12 that ends in a slot 10, wherein the depth of said depression increases from a base region 14, which is spaced apart from the slot 10 on the skin section 4, toward the slot 10. For example, the flow body 2 may be arranged on a leading edge of a wing or a tail unit such that its outer side 8 is exposed to a flow and a flow boundary layer forms thereon. A high-energy air flow may be blown into or extracted from the boundary layer through the slot 10 such that the flow around the flow body 2 is affected and particularly burbling is delayed.

The following figures make it clear that the flow body 2 is manufactured with the aid of a layer manufacturing process and forms an integral component that is free of joints.

Figure 2:
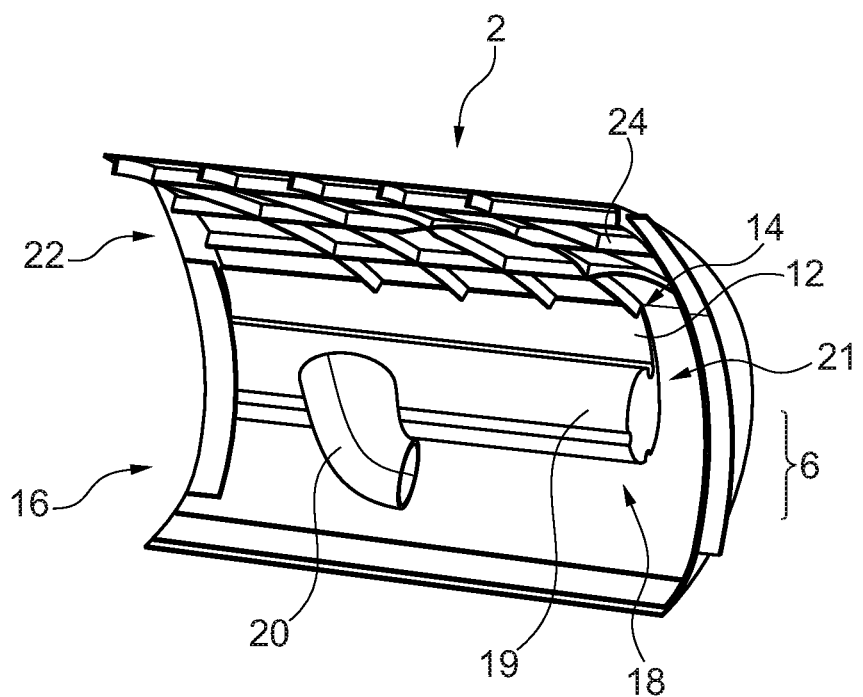
FIG. 2 shows a three-dimensional representation of an inner side of a flow body.

FIG. 2 shows an inner side 16 of the flow body 2 with the depression 12 that successively extends inward from the base region 14. The slot 10, which is not visible in this representation, leads into an active flow control device 18 comprising an exemplary air duct 19 with a flange 20 for being connected to a not-shown air source or air sink. An air discharge region 21 is integrally connected to the skin section 4.

The flow body 2 is manufactured integrally, i.e. all components shown in FIG. 2 form an integral part of the flow body 2. The flow control device 18, which essentially extends along the leading edge region 6, particularly may fulfill a load-bearing function due to the integral connection of the air discharge region 21 to the skin section 4 such that separate reinforcing element on the inner side 16 of the skin section 4 may be eliminated.

In order to reinforce a region 22 of the flow body 2 that is spaced apart from the depression 12, for example, projections 24 acting similar to reinforcing beads are arranged on the inner side 16 in the form of a grating. Due to the layer manufacturing process, it is not necessary to manufacture the projections 24 of a solid material. In fact, it is sensible to realize the projections 24 at least partially hollow such that a particularly advantageous geometrical moment of inertia for the reinforcement is achieved, however, with the least weight possible.

The arrangement including skin section 4, projections 24, depression 12, air duct 19 and flange 20 is preferably manufactured in the form of a one-piece flow body 2 such that no seals at all are required, particularly between the air duct 19 and the slot 10 or the flange 20, respectively. The structural space required on the inner side 16 is simultaneously reduced, which in turn has particularly advantageous effects on the attainable weight. Since no air-tight seal is required between the projections 24 and the skin section 4, the projections 24 may also be manufactured separately and arranged on the skin section 4.

Figure 3:
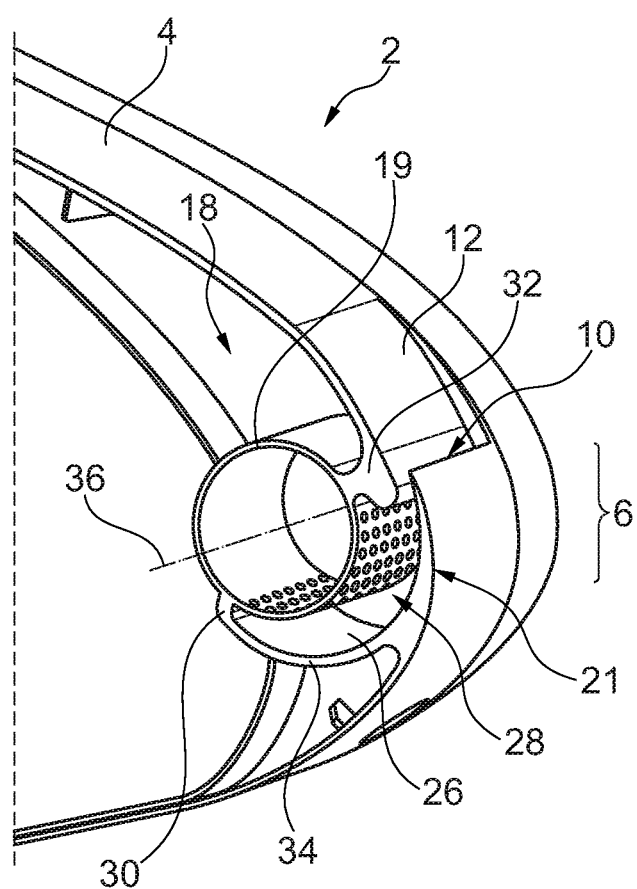
FIG. 3 shows a three-dimensional representation of a section through a flow body.

FIG. 3 shows a three-dimensional section through the flow body 2. This figure illustrates the interaction between the air duct 19 of the active flow control device 18 and the skin section 4, as well as the slot 10. Air is blown into a plenum chamber 26, the region of which extending toward the slot 10 acts as air discharge section 21, through a perforated region 28 of the air duct 19, wherein said plenum chamber extends from the depression 12 into the interior of the flow body 2 through the slot in a spiral-shaped fashion, and wherein the air blown into the plenum chamber may flow into the boundary layer of the flow around the flow body 2 through the slot 10 via the depression 12. The plenum chamber 26 is connected to the air duct 19 by means of a web 30 that faces away from the slot 10 and a web 32 is likewise located between the air duct 19 and the depression 12. A particularly lightweight flow body 2 is realized due to the integral design of the skin section 4, the plenum chamber 26, the air duct 19 and the webs 30 and 32, wherein said flow body is particularly rigid and compact due to its integral manufacture and furthermore requires no seals in the region of the webs 30 and 32, as well as between the plenum chamber 26 and the slot 10.

The plenum chamber 26 is defined by a chamber bottom 34 with a uniform curvature that is adapted to the curvature of the leading edge region 6 of the flow body 2. Air flowing out of the air duct 19 follows the chamber bottom 34 and in an outlet region of the slot 10 assumes a flow direction that is largely defined by the curvature in the outlet region, as well as on the depression 12. The directional vector should in this case essentially correspond to the directional vector of the local boundary layer flow.

The perforated region 28 of the air duct 19 may extend over an angular range that approximately lies between 90 and 180°, wherein an angular range of approximately 150° about a center axis 36 is illustrated as an example in FIG. 3.

As a supplement, it should be noted that "comprising" does not exclude any other elements or steps, and that "a" or "an" does not exclude a plurality. It should furthermore be noted that characteristics or steps that were described with reference to one of the above exemplary embodiments may also be used in combination with other characteristics or steps of other above-described exemplary embodiments. Reference symbols in the claims should not be interpreted in a restrictive sense.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A flow body for a vehicle, comprising:
   at least one planar skin section with an outer side, an inner side and at least one opening that penetrates the skin section; and
   at least one active flow control device configured to move an air volume;
   wherein the at least one active flow control device comprises an air discharge section that is fluidically connected to the at least one opening;
   wherein the air discharge section and the at least one planar skin section are manufactured by a layer manufacturing process and form an integral component that is free of joints;
   wherein the air discharge section at least partially supports the skin section in a load-bearing fashion;
   wherein the air discharge section comprises an elongate plenum chamber that encloses a space between the inner side of the skin section and a surface of the plenum chamber;
   wherein the plenum chamber is connected to an air duct at least sectionally extends into the plenum chamber and comprises a perforation region; and,
   wherein the plenum chamber is connected to the air duct by a first web that faces away from the at least one opening, and wherein a second web is arranged between the air duct and the a depression that extends in the at least one opening at the outer side of the skin section.

2. The flow body of claim 1, wherein the air duct is realized in the form of a material section that extends along an inner surface of the plenum chamber, between an inner side of the skin section and a spaced-part wall of the plenum chamber.

3. The flow body of claim 1, further comprising at least one slot that extends along an extending direction and serves as the at least one opening that is fluidically connected to the plenum chamber.

4. The flow body of claim 1, wherein the active flow control device corresponds to at least one device of a group of devices, with the group comprising a membrane pump, fluidic actuators, a valve and air source, and a valve and suction source.

5. A method for manufacturing the flow body of claim 1, the method comprising processing steps for layer manufacturing of the flow body, the processing steps comprising:
   applying at least one layer section with predefined dimensions, which comprises a particulate, highly viscous or liquid material, onto a base layer within a predefined region; and curing the layer section such that the material forms a solid layer within predefined dimensions;

wherein at least one planar skin section with an outer side, an inner side, at least one opening that penetrates the skin section and an air discharge section of an active flow control device designed for moving an air volume, which is fluidically connected to the at least one opening, is manufactured by carrying out said processing steps;

wherein the air discharge section and the at least one planar skin section form an integral component that is free of joints; and wherein the air discharge section at least partially supports the skin section in a load-bearing fashion.

6. The method of claim 5, wherein the direction in which the layer manufacturing of the flow body is built up extends parallel to a principal extending direction of at least a portion of the flow body.

7. The flow body of claim 1, wherein the plenum chamber extends from the depression into an interior of the flow body through the at least opening in a spiral-shaped configuration.

8. A vehicle comprising a flow body, the flow body comprising:

at least one planar skin section with an outer side, an inner side and at least one opening that penetrates the skin section; and at least one active flow control device configured to move an air volume;

wherein the at least one active flow control device comprises an air discharge section that is fluidically connected to the at least one opening;

wherein the air discharge section and the at least one planar skin section are manufactured by a layer manufacturing process and form an integral component that is free of joints;

wherein the air discharge section at least partially supports the skin section in a load-bearing fashion;

wherein the air discharge section comprises an elongate plenum chamber that encloses a space between the inner side of the skin section and a surface of the plenum chamber;

wherein the plenum chamber is connected to an air duct at least sectionally extends into the plenum chamber and comprises a perforation region; and wherein the plenum chamber is connected to the air duct by a first web that faces away from the at least one opening, and wherein a second web is arranged between the air duct and the a depression that extends in the at least one opening at the outer side of the skin section.

9. The vehicle of claim 8, wherein the vehicle is realized in the form of an aircraft.

* * * * *